United States Patent [19]
Sato et al.

[11] Patent Number: 5,668,694
[45] Date of Patent: Sep. 16, 1997

[54] MULTILAYER CERAMIC CHIP CAPACITOR

[76] Inventors: Akira Sato; Naoki Kawano; Takeshi Nomura; Yukie Nakano; Tomohiro Arashi; Junko Yamamatsu, all of c/o TDK Corporation, 13-1, Nihonbashi 1-chome, Chuo-ku, Tokyo, Japan

[21] Appl. No.: 545,255

[22] Filed: Oct. 19, 1995

[30] Foreign Application Priority Data

Oct. 19, 1994 [JP] Japan .................................. 6-279867
Oct. 19, 1994 [JP] Japan .................................. 6-279868

[51] Int. Cl.⁶ .............................. H01G 4/06; G11C 11/24
[52] U.S. Cl. ................ 361/321.4; 361/313; 361/321.5; 361/322; 365/145; 365/149; 257/295
[58] Field of Search .................. 361/311–313, 320, 361/321.1, 321.5, 322; 365/145, 149; 257/295, 306, 310

[56] References Cited

U.S. PATENT DOCUMENTS 5,335,139  8/1994  Nomura et al. .
5,403,797  4/1995  Ohtani et al. .

FOREIGN PATENT DOCUMENTS 61-36170    2/1986   Japan .
61-250905  11/1986   Japan .
2-83256     3/1990   Japan .
6-84692     3/1994   Japan .
6-215979    8/1994   Japan .

OTHER PUBLICATIONS

Second International Conference On Materials Engineering For Resources, Oct. 19–22, 1994, pp. 97–98, Akira Sato, et al., "Capacitance Degradation of Ni–Electrode Multilayer Ceramic Capacitors of Temperature Stable Dielectrics Under DC Electrical Field".

*Primary Examiner*—Bot L. Ledynh

[57] ABSTRACT

The invention provides a multilayer ceramic chip capacitor which satisfies X7R property or a temperature response of its capacitance and shows a minimal change of capacitance with time under a DC electric field, a long accelerated life of insulation resistance (IR) and good DC bias performance and also provides a multilayer ceramic chip capacitor which is resistant to dielectric breakdown in addition to the above advantages. In a first form of the invention, dielectric layers contain $BaTiO_3$ as a major component and MgO, $Y_2O_3$, at least one of BaO and CaO, and $SiO_2$ as minor components in a specific proportion. In a second form, the dielectric layers further contain MnO and at least one of $V_2O_5$ and $MoO_3$ as minor components in a specific proportion. In the first form, the dielectric layer has a mean grain size of up to 0.45 μm, and in an X-ray diffraction chart of the dielectric layer, a diffraction line of (200) plane and a diffraction line of (002) plane at least partially overlap one another to form a wide diffraction line which has a half-value width of up to 0.35°.

11 Claims, 8 Drawing Sheets

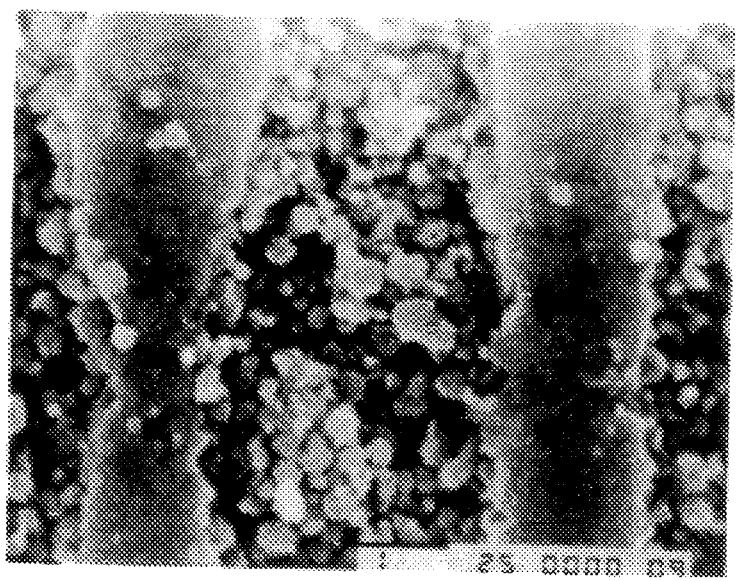
FIG.2A  1 μm
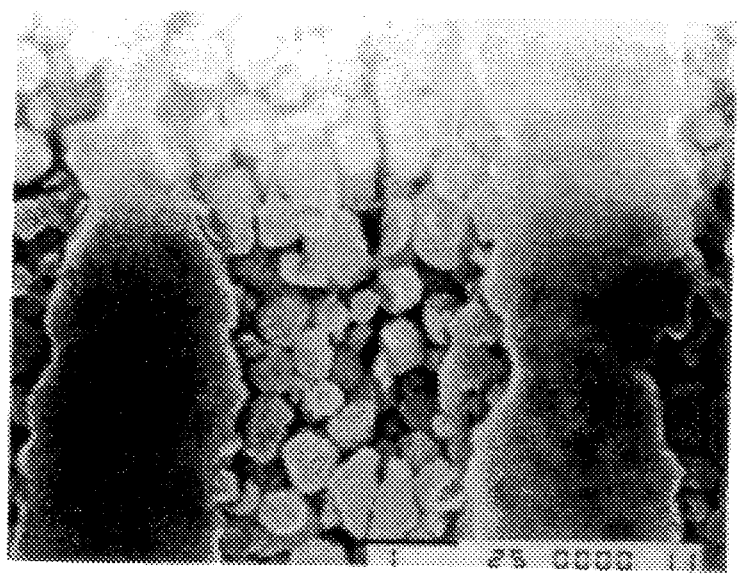
FIG.2B  1 μm

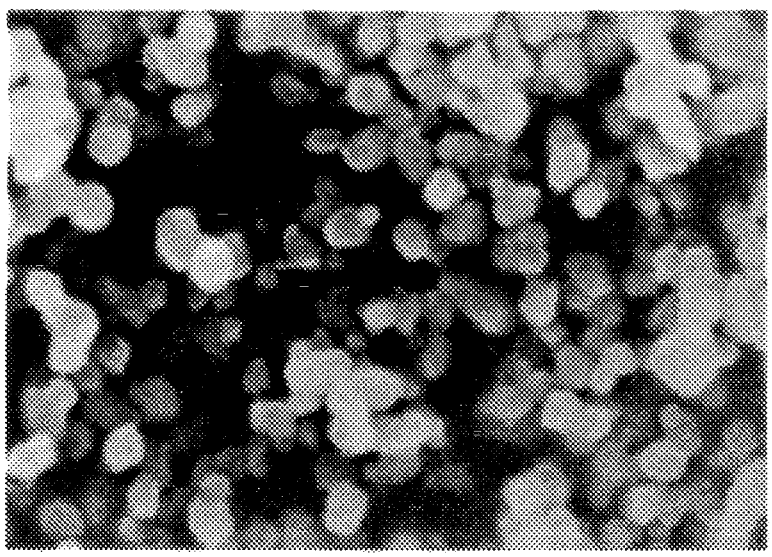
FIG.3A  1 μm
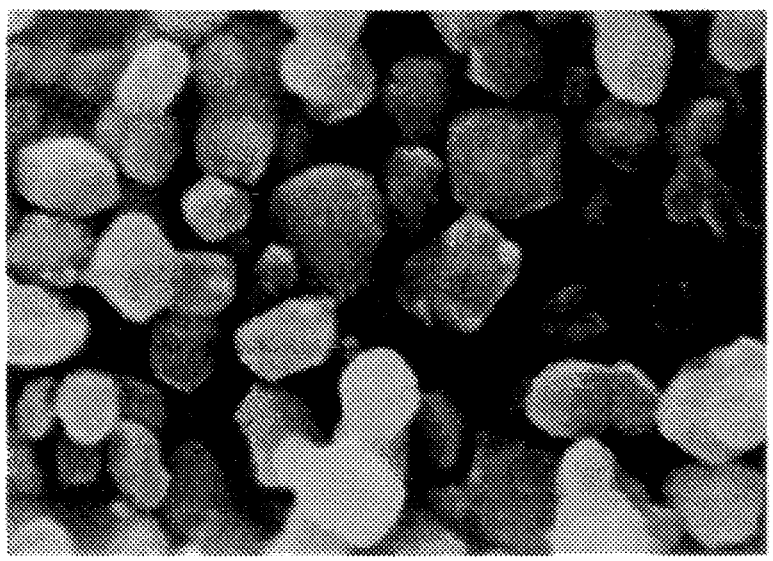
FIG.3B  1 μm

⊢—⊣
100 nm

⊢—⊣
200 nm

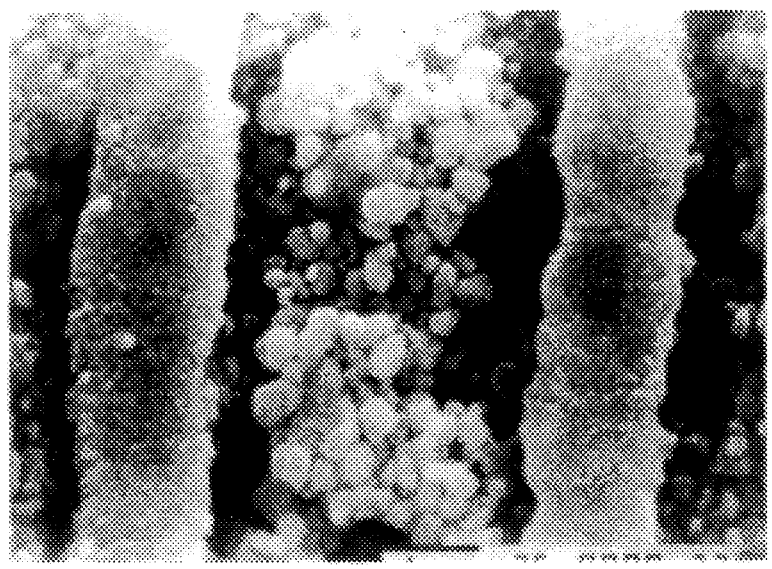
FIG.6  1 μm

100 nm

MULTILAYER CERAMIC CHIP CAPACITOR

FIELD OF THE INVENTION

This invention relates to a multilayer ceramic chip capacitor.

PRIOR ART

Multilayer ceramic chip capacitors have been widely utilized as compact, fully reliable, high capacitance electronic parts, a number of such capacitors being contained in a single electronic equipment. In accordance with a recently increasing demand for smaller size, higher performance electronic equipment, multilayer ceramic chip capacitors also encounter a more rigorous demand toward smaller size, higher capacitance, lower cost, and higher reliability.

The multilayer ceramic chip capacitors are generally fabricated by layering an internal electrode-forming paste and a dielectric layer-forming paste by sheeting, printing and similar techniques followed by concurrent firing for integration.

Generally the internal electrodes are of conductors such as Pd and Pd alloys although expensive palladium is partially replaced by the use of relatively inexpensive base metals such as Ni and Ni alloys. Since internal electrodes of base metals are oxidized if fired in ambient air, the dielectric layers and internal electrode layers must be co-fired in a reducing atmosphere. Firing in a reducing atmosphere, however, causes the dielectric layers to be reduced, resulting in a lowering of resistivity. Non-reducible dielectric materials are thus proposed.

Multilayer ceramic chip capacitors using non-reducible dielectric materials, however, have problems including a short life of insulation resistance (IR) and low reliability.

When the dielectric material is subject to a DC electric field, there arises another problem that its specific inductive capacity $\epsilon_s$ lowers with time. If thinner dielectric layers are used in order to provide chip capacitors of a smaller size and greater capacitance, application of DC voltage across the capacitor causes the dielectric layers to receive a stronger electric field, resulting in a more remarkable change of specific inductive capacity $\epsilon_s$ with time, that is, a more remarkable change of capacitance with time. Also thinner dielectric layers are likely to dielectric breakdown.

Capacitors are also required to have good DC bias performance. The term DC bias performance used herein is a percent change of capacitance of a chip capacitor from the capacitance with an AC electric field applied thereto to the capacitance with an overlapping DC electric field applied thereto. The capacitance generally decreases as the applied DC electric field is increased. Capacitors with poor DC bias performance have the problem that when a DC electric field is applied across the capacitors during normal operation, the capacitors lower their capacitance significantly to below the standard capacitance.

The EIA standards prescribe the standard known as X7R property that the percent change of capacitance should be within ±15% (reference temperature 25° C.) over the temperature range between −55° C. and 125° C.

One dielectric material known to meet the X7R property is a composition of the BaTiO$_3$+SrTiO$_3$+MnO system disclosed in Japanese Patent Application Kokai (JP-A) No. 36170/1986. This material, however, experiences a great change of capacitance with time under a DC electric field, for example, a capacitance change of −10% to −30% when a DC electric field of 50 volts is applied at 40° C. for 1,000 hours, failing to meet the X7R property.

Other non-reducible dielectric ceramic compositions include the BaTiO$_3$+MnO+MgO system disclosed in JP-A 71866/1982, the $(Ba_{1-x}Sr_xO)_aTi_{1-y}Zr_yO_2+\alpha((1-z)MnO+zCoO)+\beta((1-t)A_2O_5+tL_2O_3)+wSiO_2$ system disclosed in JP-A 250905/1986 wherein A is Nb, Ta or V and L is Y or a rare earth element, and barium titanate having added thereto $Ba_\alpha Ca_{1-\alpha}SiO_3$ in vitreous state disclosed in JP-A 83256/1990. However, these dielectric ceramic compositions could not meet all the requirements including a good temperature response of capacitance, a minimized change of capacitance with time under a DC electric field, good DC bias performance, and a long accelerated life of insulation resistance. For example, the compositions of JP-A 250905/1986 and 83256/1990 have a short accelerated life of insulation resistance.

Under such circumstances, we proposed in U.S. Ser. No. 08/090,257 a multilayer ceramic chip capacitor comprising dielectric layers which contain barium titanate as a major component and specific amounts of magnesium oxide, yttrium oxide, at least one of barium oxide and calcium oxide, and silicon oxide as minor components.

SUMMARY OF THE INVENTION

An object of the present invention is to provide a multilayer ceramic chip capacitor which satisfies X7R property or a temperature response of capacitance and shows a minimal change of capacitance with time under a DC electric field, a long accelerated life of insulation resistance (IR), and good DC bias performance. Another object of the invention is to provide such a multilayer ceramic chip capacitor which has resistance to dielectric breakdown in addition to the above advantages.

These and other objects are achieved by the present invention which is defined below as (1) to (9).

(1) A multilayer ceramic chip capacitor having a capacitor chip comprising alternately stacked dielectric layers and internal electrode layers, wherein said dielectric layer contains barium titanate as a major component and magnesium oxide, yttrium oxide, at least one selected from barium oxide and calcium oxide, and silicon oxide as minor components in such a proportion that there are present MgO: 0.1 to 3 mol
Y$_2$O$_3$: more than 0 to 5 mol
BaO+CaO: 2 to 12 mol
SiO$_2$: 2 to 12 mol per 100 mol of BaTiO$_3$, provided that the barium titanate, magnesium oxide, yttrium oxide, barium oxide, calcium oxide, and silicon oxide are calculated as BaTiO$_3$, MgO, Y$_2$O$_3$, BaO, CaO, and SiO$_2$, respectively, said dielectric layer has a mean grain size of up to 0.45 μm, and in an X-ray diffraction chart of said dielectric layer, a diffraction line of (200) plane and a diffraction line of (002) plane at least partially overlap one another to form a wide diffraction line which has a half-value width of up to 0.35°.

(2) The multilayer ceramic chip capacitor of (1) wherein said dielectric layer has a mean grain size of at least 0.10 μm and the wide diffraction line has a half-value width of at least 0.10°.

(3) The multilayer ceramic chip capacitor of (1) or (2) wherein the proportion of those crystal grains in which domain walls are observable for presence is 35 to 85% in a section of said dielectric layer.

(4) The multilayer ceramic chip capacitor of any one of (1) to (3) wherein said dielectric layer further contains manganese oxide as a minor component in such a proportion that there is present up to 0.5 mol of MnO per 100 mol of BaTiO$_3$, provided that the manganese oxide is calculated as MnO.

(5) A multilayer ceramic chip capacitor having a capacitor chip comprising alternately stacked dielectric layers and internal electrode layers, wherein said dielectric layer contains barium titanate as a major component and magnesium oxide, yttrium oxide, at least one selected from barium oxide and calcium oxide, silicon oxide, manganese oxide, and at least one selected from vanadium oxide and molybdenum oxide as minor components in such a proportion that there are present MgO: 0.1 to 3 mol
Y$_2$O$_3$: more than 0 to 5 mol
BaO+CaO: 2 to 12 mol
SiO$_2$: 2 to 12 mol
MnO: more than 0 to 0.5 mol
V$_2$O$_5$: 0 to 0.3 mol
MoO$_3$: 0 to 0.3 mol
V$_2$O$_5$+MoO$_3$: more than 0 mol per 100 mol of BaTiO$_3$, provided that the barium titanate, magnesium oxide, yttrium oxide, barium oxide, calcium oxide, silicon oxide, manganese oxide, vanadium oxide, and molybdenum oxide are calculated as BaTiO$_3$, MgO, Y$_2$O$_3$, BaO, CaO, SiO$_2$, MnO, V$_2$O$_5$, and MoO$_3$, respectively.

(6) The multilayer ceramic chip capacitor of (5) wherein said dielectric layer has a mean grain size of up to 0.45 μm, and in an X-ray diffraction chart of said dielectric layer, a diffraction line of (200) plane and a diffraction line of (002) plane at least partially overlap one another to form a wide diffraction line which has a half-value width of up to 0.35°.

(7) The multilayer ceramic chip capacitor of (6) wherein said dielectric layer has a mean grain size of at least 0.10 μm and the wide diffraction line has a half-value width of at least 0.10°.

(8) The multilayer ceramic chip capacitor of (6) or (7) wherein the proportion of those crystal grains in which domain walls are observable for presence is 35 to 85% in a section of said dielectric layer.

(9) The multilayer ceramic chip capacitor of any one of (1) to (8) wherein said internal electrode layer comprises a conductor in the form of nickel or a nickel alloy.

The present invention ensures that a multilayer ceramic chip capacitor satisfies X7R property on a temperature response of capacitance and shows a minimal change of capacitance with time under a DC electric field, a long accelerated life of insulation resistance (IR), and good DC bias performance as reported in the above-referred U.S. Ser. No. 08/090,257.

In the first form of the invention, the dielectric layers have a mean grain size of up to 0.45 μm and specific characteristics in terms of X-ray diffraction, thereby further improving the change of capacitance with time under a DC electric field. Consequently, fully high reliability is obtained even when dielectric layers are reduced in thickness so that the electric field strength becomes higher. Also the reduction of the mean grain size leads to an improvement in accelerated life of IR.

In the second form of the invention, the dielectric layers contain a specific amount of vanadium oxide and/or molybdenum oxide, thereby further improving the change of capacitance with time under a DC electric field. The addition of vanadium oxide leads to an improved dielectric breakdown voltage and the addition of molybdenum oxide leads to an improved accelerated life of IR. Also where the dielectric layers have a mean grain size of up to 0.45 μm and specific characteristics in terms of X-ray diffraction in the second form, the change of capacitance with time under a DC electric field and the accelerated life of IR are further improved as in the first form.

As mentioned above, the multilayer ceramic chip capacitor of the present invention ensures fully high reliability even when dielectric layers are reduced in thickness so that the electric field strength becomes higher.

It is noted that improvements in the change of capacitance with time under a DC electric field and the accelerated life of IR are acknowledged in the samples of Examples in the above-referred U.S. Ser. No. 08/090,257 although these measurements are made under more moderate conditions than in Examples of the present invention to be described later. The samples of Examples in the above-referred U.S. Ser. No. 08/090,257 wherein the dielectric layers have a mean grain size of more than 0.45 μm and the wide diffraction line has a half-value width of more than 0.35° will fail to achieve fully satisfactory results if measurements are made under severer conditions as in Examples of the present invention.

"Multilayer Ceramic Capacitors", Gakuken K. K., pages 33–38, describes a report about "low temperature firing barium titanate." In the report, fine barium titanate powder is prepared using various techniques and sintered bodies having a grain size of 0.3 to 0.8 μm are obtained by adding CuO, Bi$_2$O$_3$, PbO or the like followed by liquid phase sintering. The report describes sintered bodies having a grain size overlapping the mean grain size range defined in the present invention although no reference is made to diffraction lines of (200) and (002) planes in X-ray diffraction charts of dielectric layers. Unlike the dielectric layer composition according to the present invention, the sintered barium titanate bodies with a grain size of 0.3 to 0.8 μm described in the report cannot be fired in a reducing atmosphere, precluding the use of inexpensive nickel electrodes.

BRIEF DESCRIPTION OF THE DRAWINGS

FIGS. 2(a) and 2(b) are figure-substituting photographs or scanning electron photomicrographs in cross section of a dielectric layer in a multilayer ceramic chip capacitor.

FIGS. 3(a) and 3(b) are figure-substituting photographs or scanning electron photomicrographs of BaTiO$_3$ powder used to form the dielectric layers of FIG. 2.

FIG. 6 is a figure-substituting photograph or scanning electron photomicrograph in cross section of a dielectric layer in a multilayer ceramic chip capacitor.

BEST MODE FOR CARRYING OUT THE INVENTION

The illustrative construction of the present invention is described in detail.

Multilayer Ceramic Chip Capacitor

Figure 1:
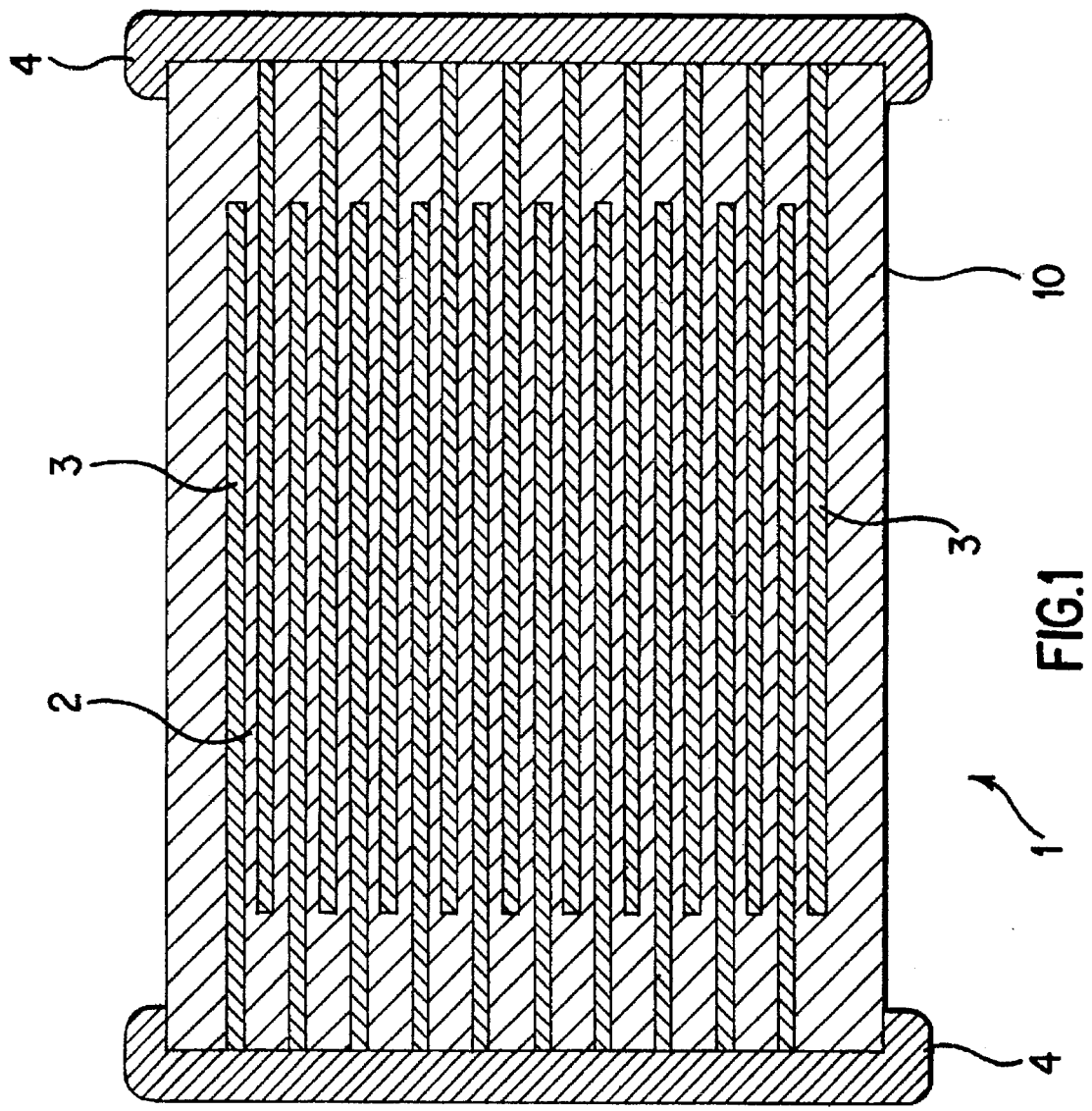
FIG. 1 is a cross-sectional view showing one exemplary structure of a multilayer ceramic chip capacitor according to the invention.

FIG. 1 shows in cross section one exemplary structure of a multilayer ceramic chip capacitor according to the invention.

As seen from FIG. 1, the multilayer ceramic chip capacitor 1 of the invention includes a capacitor chip 10 having a plurality of alternately stacked dielectric layers 2 and internal electrode layers 3. The capacitor 1 further includes external electrodes 4 disposed on the side surfaces of the capacitor chip 10 and in electrical connection to the internal electrode layers 3. The shape of capacitor chip 10 is not critical although it is often rectangular shaped. Also the size is not critical and the chip may have appropriate dimensions in accordance with a particular application, typically in the range of 1.0–5.6 mm×0.5–5.0 mm×0.5–1.9 mm. The internal electrode layers 3 are stacked such that they at opposite ends are alternately exposed at opposite side surfaces of the capacitor chip 10. The external electrodes 4 are applied to the opposite side surfaces of the capacitor chip 10 to constitute a desired capacitor circuit.

Dielectric Layer 2

In the first embodiment, the dielectric layers 2 contain barium titanate as a major component and magnesium oxide, yttrium oxide, at least one of barium oxide and calcium oxide, and silicon oxide as minor components.

In the second embodiment, the dielectric layers 2 contain barium titanate as a major component and magnesium oxide, yttrium oxide, at least one of barium oxide and calcium oxide, silicon oxide, manganese oxide, and at least one of vanadium oxide and molybdenum oxide as minor components.

Provided that barium titanate is calculated as $BaTiO_3$, magnesium oxide as $MgO$, yttrium oxide as $Y_2O_3$, barium oxide as $BaO$, calcium oxide as $CaO$, silicon oxide as $SiO_2$, manganese oxide as $MnO$, vanadium oxide as $V_2O_5$, and molybdenum oxide as $MoO_3$, the dielectric layer contains these components in such a proportion that there are present per 100 mol of $BaTiO_3$, in the first form, MgO: 0.1 to 3 mol, preferably 0.5 to 2.0 mol $Y_2O_3$: more than 0 to 5 mol, preferably 0.1 to 5 mol, more preferably more than 1 to 5 mol, most preferably 1.1 to 3.5 mol BaO+CaO: 2 to 12 mol, preferably 2 to 6 mol $SiO_2$: 2 to 12 mol, preferably 2 to 6 mol and in the second form, MgO: 0.1 to 3 mol, preferably 0.5 to 2.0 mol $Y_2O_3$: more than 0 to 5 mol, preferably 0.1 to 5 mol, more preferably more than 1 to 5 mol, most preferably 1.1 to 3.5 mol BaO+CaO: 2 to 12 mol, preferably 2 to 6 mol $SiO_2$: 2 to 12 mol, preferably 2 to 6 mol MnO: more than 0 to 0.5 mol, preferably 0.01 to 0.4 mol $V_2O_5$: 0 to 0.3 mol, preferably 0 to 0.25 mol $MoO_3$: 0 to 0.3 mol, preferably 0 to 0.25 mol $V_2O_5+MoO_3$: more than 0 mol, preferably 0.01 to 0.3 mol, more preferably 0.05 to 0.25 mol.

The oxidation state of each oxide is not critical insofar as the contents of metal elements constituting the respective oxides are within the above-defined ranges.

Another compound may be contained in the dielectric layers 2 although it is preferred that the material is substantially free of cobalt oxide because its presence leads to an increased change of capacitance.

Described below are the reasons for the limitation of the contents of the respective minor components.

With magnesium oxide contents below the above-defined range, it is difficult to provide a minimal change with time of capacitance. Magnesium oxide contents above the above-defined range drastically detract from sinterability and thus lead to less densification, resulting in a shorter accelerated IR life and a lower specific inductive capacity.

Yttrium oxide is effective for improving the accelerated IR life and DC bias performance. Lesser contents of yttrium oxide provide less addition effect, especially insufficient DC bias performance. Yttrium oxide contents above the above-defined range result in a reduced specific inductive capacity and detracts from sinterability, leading to less densification.

Less contents of BaO+CaO below the above-defined range result in a greater change of capacitance with time upon application of a DC electric field and a shorter accelerated IR life and fail to provide a desirable temperature response of capacitance. Larger contents of these components result in a shorter accelerated IR life and a drastic lowering of specific inductive capacity. Less contents of $SiO_2$ below the above-defined range detract from sinterability, leading to less densification whereas contents above the range result in too low initial insulation resistance.

Manganese oxide is effective for densification of dielectric layers and improving an accelerated IR life. With too larger contents of manganese oxide, it is difficult to reduce a change of capacitance with time under an applied DC electric field. Manganese oxide may be added in the first embodiment too. Preferably manganese oxide is contained in an amount of up to 0.5 mol, more preferably up to 0.4 mol calculated as MnO per 100 mol of $BaTiO_3$. To be fully effective, manganese oxide should preferably be contained in an amount of at least 0.01 mol.

Vanadium oxide and molybdenum oxide are effective for improving a percent change of capacitance with time under a DC electric field. Additionally, vanadium oxide is effective for improving a dielectric breakdown voltage and molybdenum oxide is effective for improving an accelerated IR life. Too large contents of at least one of $V_2O_5$ and $MoO_3$ result in an extreme drop of initial IR.

The dielectric layer may further contain aluminum oxide which enables sintering at relatively low temperatures. Aluminum oxide is preferably contained in an amount of up to 1% by weight of the dielectric layer calculated as $Al_2O_3$. Larger amounts of aluminum oxide would result in a noticeable lowering of specific inductive capacity and at the same time, a short accelerated IR life.

In the first embodiment, the dielectric layer has a mean crystal grain size of up to 0.45 μm, preferably up to 0.35 μm. In the second embodiment too, a mean grain size within this range is preferred. Such a submicron mean grain size leads to reduced crystal anisotropy and hence, a smaller change of capacitance with time. A submicron mean grain size also leads to an improved accelerated life of IR. No particular lower limit is imposed on the grain size although a smaller mean grain size must be accomplished using a dielectric raw powder having a corresponding very small size, which is difficult to form a paste. For this reason, usually the dielectric layer preferably has a mean grain size of at least 0.10 μm. It is noted that the mean grain size of the dielectric layer is determined by polishing the dielectric layer, chemically or thermally etching the polished surface, and calculating the size from a scanning electron photomicrograph by planimetry.

The dielectric layer consists of crystal grains which are of the tetragonal system near room temperature. A reduction of crystal anisotropy means an approach to the cubic system. The degree of anisotropy of crystals is determinable by X-ray diffractometry of the dielectric layer. As crystals reduce anisotropy, a diffraction line of (200) plane shifts toward a low angle side and a diffraction line of (002) plane shifts toward a high angle side so that both the diffraction lines overlap one another at least in part. Where the mean grain size is below 0.45 μm, usually the two diffraction lines are not apparently observed as independent lines and instead, a wide diffraction line is observed between the position of a diffraction line of (200) plane (2θ= approximately 45.4°) and the position of a diffraction line of (002) plane (2θ=approximately 44.9°). In the first embodiment, this wide diffraction line has a half-value width of up to 0.35°, preferably up to 0.30°. The second embodiment also favors a half-value width in such a range. If the half-value width is too large, the reduction of crystal anisotropy is insufficient. No particular lower limit is imposed on the half-value width although the half-value width is usually at least 0.15° because it is difficult to obtain a half-value width of less than 0.10°. For X-ray diffractometry, $CuK\alpha_1$ ray is used.

Where crystals have relatively great anisotropy, the peak of a diffraction line of (200) plane and the peak of a diffraction line of (002) plane are sometimes observed as independent. Then there usually results a wide diffraction line wherein the peak of a diffraction line of (002) plane appears at the shoulder of a diffraction line of (200) plane. In this case, the width of the wide diffraction line cut at a height equal to one half of the highest peak is the half-value width of this wide diffraction line.

Where the mean grain size is below 0.45 μm, the proportion of those crystal grains in which domain walls are observable as being present in a transmission electron photomicrograph of a section of the dielectric layer is preferably 35 to 85%, more preferably 35 to 50%. Higher proportions of those crystal grains in which domain walls are observable would lead to larger changes of capacitance with time.

It is preferred that elements are locally distributed in the crystal grains of the dielectric layer. Some elements are concentrated at the center of crystal grains while other elements are concentrated at the periphery of crystal grains. However, it is difficult to definitely confirm such a local distribution in an image under an electron microscope.

The dielectric layers have an appropriate Curie temperature which is determined in accordance with the applicable standards by suitably selecting a particular composition. Typically the Curie temperature is higher than 85° C., especially about 120° to 135° C.

No particular limit is imposed on the thickness of each dielectric layer. The application of the present invention permits the dielectric layer to be less than 4 μm thick and even less than 2 μm thick while maintaining a less change of capacitance with time and full reliability. Where the layers are formed by a printing technique, the lower limit of thickness is usually about 0.5 μm. The number of dielectric layers stacked is generally from 2 to about 300.

Internal Electrode Layer 3

The conductor of which the internal electrode layers 3 are formed is not critical although a base metal may be used since the material of the dielectric layers 2 has anti-reducing properties. Preferred base metals used as the conductor are nickel and nickel alloys. Preferred nickel alloys are alloys of nickel with at least one member selected from Fan, Cr, Co and Al, with such nickel alloys containing at least 95% by weight of nickel being more preferred.

It is to be noted that nickel and nickel alloys may contain up to about 0.1% by weight of phosphorus and other trace components.

The thickness of the internal electrode layers may be suitably determined in accordance with a particular application although it is typically about 0.5 to 5 μm, especially about 0.5 to 2.5 μm.

External Electrode 4

The conductor of which the external electrodes 4 are formed is not critical although inexpensive metals such as nickel, copper and alloys thereof may be used in the practice of the invention.

The thickness of the external electrodes may be suitably determined in accordance with a particular application although it is preferably about 10 to 50 μm.

Preparation of Multilayer Ceramic Chip Capacitor

The multilayer ceramic chip capacitor of the present invention is fabricated by forming a green chip by conventional printing and sheeting methods using pastes, firing the chip, and printing or transferring external electrodes thereto followed by baking.

Dielectric Layer-forming Paste

Paste for forming dielectric layers is obtained by mixing a raw dielectric material with an organic vehicle.

For the raw dielectric material, there are used powders corresponding to the composition of dielectric layers. The procedure for preparing the raw dielectric material is not critical. For example, a procedure of mixing $BaTiO_3$ synthesized by hydrothermal synthesis or similar method with minor component raw materials may be used. Also useful are a dry synthesis procedure of calcining a mixture of $BaCO_3$, $TiO_2$ and minor component raw materials, followed by solid phase reaction and a hydrothermal synthesis procedure. It is also acceptable to synthesize the raw dielectric material by calcining a mixture of a precipitate obtained by co-precipitation, sol-gel, alkali hydrolysis and precipitate mixing methods and minor component raw materials. The minor component raw materials used herein may be oxides and at least one of various compounds which convert to oxides upon firing, for example, carbonates, oxalates, nitrates, hydroxides, and organometallic compounds.

The mean particle size of the raw dielectric material may be determined in accordance with the desired mean grain size of dielectric layers. Since little grain growth occurs in the composition system used in the invention, a powder having a mean particle size of up to 0.4 μm is generally used as the raw dielectric material in order that the dielectric layers may have a mean grain size of up to 0.45 μm. It is noted in this regard that the raw dielectric material preferably has a specific surface area of at least 2.5 $m^2/g$ as measured by BET.

The organic vehicle is a binder in an organic solvent. The binder used for the organic vehicle is not critical and may be suitably selected from conventional binders such as ethyl cellulose. Also the organic solvent used herein is not critical and may be suitably selected from conventional organic solvents such as terpineol, butyl carbitol, acetone and toluene in accordance with a particular application method such as a printing or sheeting method.

Internal Electrode Layer-forming Paste

Paste for forming internal electrode layers is prepared by mixing conductors such as conductive metals and alloys as mentioned above or various compounds which convert into such conductors upon firing, for example, oxides, organometallic compounds and resinates with organic vehicles as mentioned above.

External Electrode-forming Paste

Paste for forming external electrodes may be prepared by the same method as the internal electrode layer-forming paste.

Organic Vehicle Content

No particular limit is imposed on the organic vehicle content of the respective pastes mentioned above. There may be used conventional contents, for example, about 1 to 5% by weight of the binder and about 10 to 50% by weight of the solvent. If desired, the respective pastes may contain other additives such as dispersants, plasticizers, dielectric compounds and insulating compounds. The total content of these additives is preferably up to 10% by weight.

Preparation of Green Chips

Where a printing method is employed, a green chip is prepared by alternately printing the dielectric layer-forming paste and the internal electrode layer-forming paste onto a substrate of PET or the like in laminar form, cutting the laminar stack to a predetermined shape and separating it from the substrate.

Where a sheeting method is employed, a green chip is prepared by forming green sheets from the dielectric layer-forming paste, printing the internal electrode layer-forming paste on the respective green sheets, stacking the printed green sheets, and cutting to a predetermined shape.

Binder Removal Step

Binder removal prior to firing may be carried out under conventional conditions, preferably under the following conditions where the internal electrode layers are formed of a base metal conductor such as nickel and nickel alloys.

Heating rate: 5°–300° C./hour, especially 10°–100° C./hour

Holding temperature: 200°–400° C., especially 250°–300° C.

Holding time: ½–24 hours, especially 5–20 hours

Atmosphere: air

Firing Step

The green chip is then fired in an atmosphere which may be properly determined in accordance with the type of conductor in the internal electrode layer-forming paste. Where base metals such as nickel and nickel alloys are used as the conductor, the firing atmosphere may have an oxygen partial pressure of $10^{-8}$ to $10^{-12}$ atm. At an oxygen partial pressure below the range, the conductor of the internal electrode layers can be abnormally sintered and disconnected. At an oxygen partial pressure above the range, the internal electrode layers are likely to be oxidized.

The holding temperature during firing is preferably 1,100° to 1,400° C., more preferably 1,200° to 1,300° C. Lower holding temperatures below the range would provide insufficient densification whereas higher holding temperatures beyond the range can lead to a greater change of capacitance with time upon application of a DC electric field.

Conditions other than the above-mentioned are preferably as follows.

Heating rate: 50°–500° C./hour, especially 200°–300° C./hour

Holding time: ½–8 hours, especially 1–3 hours

Cooling rate: 50°–500° C./hour, especially 200°–300° C./hour

The firing atmosphere is preferably a reducing atmosphere and the atmospheric gas is preferably a humidified mixture of $N_2$ and $H_2$ gases, for example.

Annealing Step

Firing of the capacitor chip in a reducing atmosphere is preferably followed by annealing. Annealing is effective for re-oxidizing the dielectric layers, thereby significantly extending the accelerated IR life.

The annealing atmosphere may have an oxygen partial pressure of at least $10^{-6}$ atm., preferably $10^{-5}$ to $10^{-4}$ atm. The dielectric layers are short of re-oxidization at a low oxygen partial pressure below the range whereas the internal electrode layers are likely to be oxidized above the range.

The holding temperature during annealing is preferably lower than 1,100° C., more preferably 500° to 1,000° C. Lower holding temperatures below the range would oxidize the dielectric layers to a less extent leading to a shorter life. Higher holding temperatures beyond the range can cause the internal electrode layers to be oxidized leading to a reduced capacitance and to react with the dielectric material leading to a shorter life. Understandably the annealing step can be accomplished simply by heating and cooling. In this case, the holding temperature is equal to the highest temperature on heating and the holding time is zero.

Conditions other than the above-mentioned are preferably as follows.

Holding time: 0–20 hours, especially 6–10 hours

Cooling rate: 5°–500° C./hour, especially 100°–300° C./hour

The preferred atmosphere gas used is humidified $N_2$ gas.

For humidifying $N_2$ gas or a gas mixture used in the binder removal, firing and annealing steps, a wetter may be used, for example. In this regard, water temperature is preferably about 5° to 75° C.

The foregoing binder removal, firing and annealing steps may be carried out either continuously or independently.

Where the steps are continuously carried out, it is preferred to change only the atmosphere without cooling after binder removal, raise the temperature to the holding temperature for firing, effect firing, then cool, change the atmosphere when the holding temperature for annealing is reached, and effect annealing.

Where the steps are independently carried out, in the firing step, the same atmosphere as in binder removal is used while heating to the holding temperature for the binder removal step, and the temperature is raised therefrom to the holding temperature to effect firing. The firing atmosphere is maintained while cooling to the holding temperature for the annealing step. Then the above-mentioned annealing atmosphere is used while cooling from the holding temperature for the annealing step. Also in the annealing step of the independent mode, the atmosphere may be changed after heating to the holding temperature in a $N_2$ gas atmosphere, or a humidified $N_2$ gas atmosphere may be used throughout the annealing step.

Formation of External Electrode

The thus obtained capacitor chip is polished at end faces by barrel tumbling and sand blasting, for example, before the external electrode-forming paste is printed or transferred and baked to form external electrodes 4. Conditions for firing of the external electrode-forming paste include a humid mixture of $N_2$ and $H_2$ gases, about 600° to 800° C., and about 10 minutes to about 1 hour, for example.

If necessary, pads are formed on the external electrodes 4 as by plating.

The multilayer ceramic chip capacitors of the invention thus prepared are mounted on printed circuit boards, for example, by soldering before use in various electronic equipment.

During operation of the multilayer ceramic chip capacitors of the invention, a DC electric field of at least $0.02V/\mu m$, often at least $0.2V/\mu m$, more often at least $0.5V/\mu m$ and generally up to about $5V/\mu m$ is applied across the dielectric layers while an AC component is generally applied in an overlapping manner. The capacitors experience a minimized change of their capacitance with the lapse of time even when such a DC electric field is applied.

EXAMPLE

Examples of the invention are given below by way of illustration.

Example 1 (first embodiment)

The following pastes were prepared.

Dielectric Layer-forming Paste

A raw dielectric material was prepared by wet milling $BaTiO_3$ prepared by a hydrothermal synthesis method with $(MgCO_3)_4 \cdot Mg(OH)_2 \cdot 5H_2O$, $MnCO_3$, $BaCO_3$, $CaCO_3$, $SiO_2$, and $Y_2O_3$ in a ball mill for 16 hours. By changing the preparation parameters, there were prepared a plurality of raw dielectric materials having a varying mean particle size. Another raw dielectric material was prepared using $BaTiO_3$ prepared by a sol-gel method. The nominal mean particle size and BET value of $BaTiO_3$ used in the respective dielectric materials are shown in Table 1.

A paste was prepared by milling 100 parts of each raw dielectric material, 4.8 parts of an acrylic resin, 40 parts of methylene chloride, 20 parts of trichloroethane, 6 parts of mineral spirit, and 4 parts of acetone in a ball mill.

Internal Electrode Layer-forming Paste

A paste was prepared by milling 100 parts of nickel particles having a mean particle size of 0.8 μm, 40 parts of an organic vehicle (obtained by dissolving 8 parts by weight of ethyl cellulose resin in 92 parts of butyl carbitol), and 10 parts of butyl carbitol in a three-roll mill.

External Electrode-forming Paste

A paste was prepared by milling 100 parts of copper particles having a mean particle size of 0.5 μm, 35 parts of an organic vehicle (obtained by dissolving 8 parts by weight of ethyl cellulose resin in 92 parts of butyl carbitol), and 7 parts of butyl carbitol.

Using the respective dielectric layer-forming pastes and the internal electrode layer-forming paste, multilayer ceramic chip capacitors of the configuration shown in FIG. 1 were fabricated.

First the dielectric layer-forming paste was applied to PET film to form a green sheet of 5 μm thick, onto which the internal electrode layer-forming paste was printed. The green sheet was separated from the PET film. A plurality of such green sheets were stacked and bonded under pressure to form a green laminate. The number of stacked sheets was 4.

After the green laminate was cut to a predetermined size, the green chip was continuously removed of the binder, fired, and annealed under the following conditions, obtaining a capacitor chip.

Binder Removal

Heating rate: 15° C./hr.
Holding temperature: 280° C.
Holding time: 8 hours
Atmospheric gas: air Firing Heating rate: 200° C./hr.
Holding temperature: 1300° C.
Holding time: 2 hours
Cooling rate: 300° C./hr.
Atmospheric gas: humid $N_2$ and $H_2$ gas mixture
Oxygen partial pressure: $10^{-9}$ atm.

Annealing

Holding temperature: 900° C.
Holding time: 9 hours
Cooling rate: 300° C./hr.
Atmospheric gas: humid $N_2$ gas
Oxygen partial pressure: $10^{-5}$ atm.

For humidifying the atmosphere gases, a wetter was used at a water temperature of 35° C.

The capacitor chip thus obtained was polished at end faces by sand blasting. The external electrode-forming paste was transferred to the end faces and fired in a humid $N_2+H_2$ gas atmosphere at 800° C. for 10 minutes to form external electrodes. There was completed a multilayer ceramic chip capacitor sample.

The capacitor samples had dimensions 3.2 mm×1.6 mm×0.6 mm, the dielectric layers were 3 μm thick, and the internal electrodes were 2 μm thick.

The composition of the dielectric layers of each sample was

MgO: 2.0 mol,
$Y_2O_3$: 2.13 mol,
BaO: 3.36 mol,
CaO: 2.44 mol,
BaO+CaO: 5.8 mol,
$SiO_2$: 5.8 mol, and
MnO: 0.19 mol expressed as a proportion relative to 100 mol of $BaTiO_3$ as previously described.

The dielectric layers of each sample have a mean grain size as shown in Table 1. The mean grain size was calculated by the previously described procedure using a scanning electron photomicrograph of a sample section. FIGS. 2(a)

and 2(b) are scanning electron photomicrographs of dielectric layers of sample Nos. 103 and 105. For comparison purposes, FIGS. 3(a) and 3(b) are scanning electron photomicrographs of BaTiO₃ powder used in the preparation of dielectric layers of sample Nos. 103 and 105.

Figure 4:
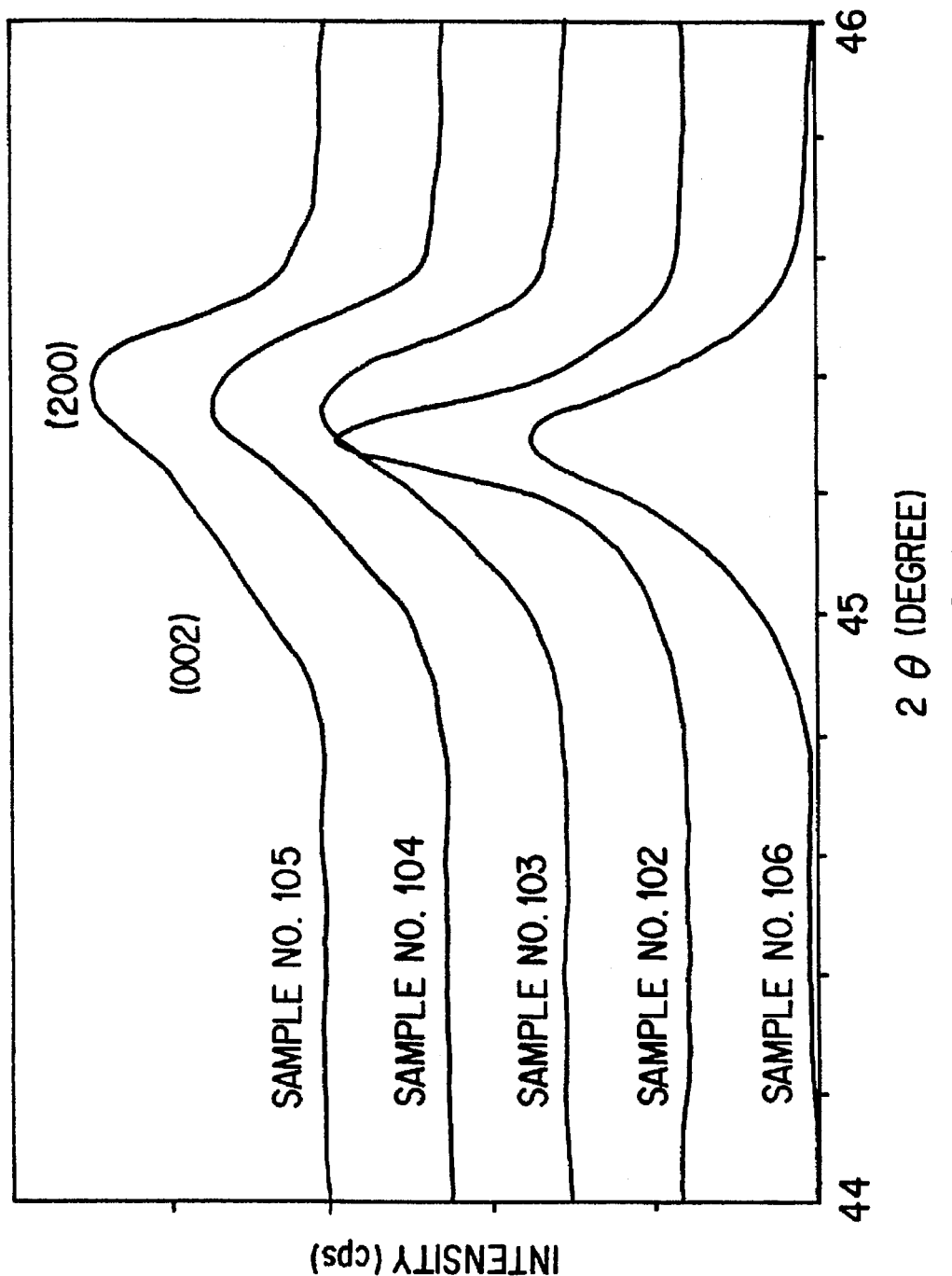
FIG. 4 is a X-ray diffraction chart of dielectric layers in multilayer ceramic chip capacitors.

The dielectric layer was subject to X-ray diffraction by illuminating CuKα₁ ray to the surface of each sample. As a result, for all the samples, a diffraction line of (200) plane and a diffraction line of (002) plane overlapped one another to form a wide diffraction line, with the two diffraction lines being indistinguishable. X-ray diffraction charts of some samples are shown in FIG. 4. The position and half-value width of wide diffraction lines of the respective samples are shown in Table 1.

Figure 5A:
FIG. 5(a) and 5(b) are figure-substituting photographs or transmission electron photomicrographs of a dielectric layer in a multilayer ceramic chip capacitor.
Figure 5B:
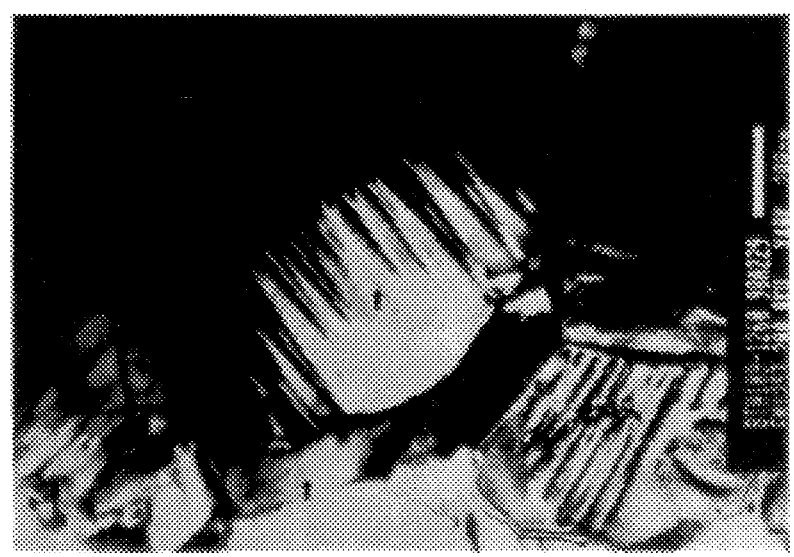

Photomicrographs of the dielectric layers of the respective samples were taken through a transmission electron microscope. FIGS. 5(a) and 5(b) are photographs of sample Nos. 103 and 105. For the respective samples, the proportion of crystal grains in which domain walls were observable was determined from these photos. The results are shown in Table 1.

The samples were examined by the following tests. The results are shown in Table 1.

Accelerated Life of Insulation Resistance IR

The sample was subjected to an accelerated test under an electric field of 15V/μm at 140° C. The life was the time passed until the insulation resistance (IR) lowered to below $2 \times 10^5$ Ω.

Specific Inductive Capacity $\epsilon_s$

A specific inductive capacity was measured at 25° C.

DC Bias Performance

Using an LCR meter, an initial capacitance $C_O$ was measured with a measuring AC voltage of 1.0 volt. Next, with an AC voltage of 1.0 volt applied, a DC electric field of 1.0 volt per μm of the dielectric layer thickness was applied across the sample in an overlapping manner which was measured for capacitance. A change $\Delta C_2$ from the initial capacitance $C_O$ was determined, from which a percent change $\Delta C_2/C_O$ was calculated.

TABLE 1

(first embodiment)

| Sample No. | BaTiO₃ Mean Particle size (μm) | BET (m²/g) | Dielectric layer mean grain size (μm) | Diffraction line position (deg) | Diffraction line half-value width (deg) | Domain wall proportion (%) | Change of Temperature response X7R | capacitance with time (%) | Accelerated life of IR (hr.) | $\epsilon_s$ (25° C.) | DC bias performance (%) |
|---|---|---|---|---|---|---|---|---|---|---|---|
| 101 | 0.15 | 11.0 | 0.19 | 45.28 | 0.16 | 37 | ○ | −2.8 | 140 | 1530 | −3.0 |
| 102 | 0.2 | 7.2 | 0.23 | 45.29 | 0.17 | 48 | ○ | −3.4 | 113 | 1680 | −3.9 |
| 103 | 0.3 | 3.7 | 0.33 | 45.33 | 0.31 | 49 | ○ | −5.6 | 52 | 1840 | −7.8 |
| 104 | 0.4 | 3.1 | 0.44 | 45.32 | 0.35 | 80 | ○ | −6.1 | 11 | 2350 | −8.5 |
| 105 (comparison) | 0.5 | 2.2 | 0.60* | 45.37 | 0.38* | 93* | ○ | −9.1 | 0.9 | 2580 | −19.2 |
| 106** | | 3.3 | 0.24 | 45.29 | 0.29 | 45 | ○ | −5.1 | 192 | 1760 | −5.1 |

*values outside the limited range
**sol-gel method

Temperature Response of Capacitance

X7R property: Using an LCR meter, the capacitance was measured with a measuring voltage of 1 volt over the temperature range between −55° C. and 125° C. to examine whether or not a capacitance change might fall within ±15% (reference temperature 25° C.). The sample was rated "○" when the requirement was satisfied and "X" when not satisfied.

Change of Capacitance with Time in a DC Electric Field

Using an LCR meter, a sample was measured for initial capacitance $C_O$ with a measuring AC voltage of 1.0 volt. After a DC electric field of 2.1 volts per μm of the dielectric layer thickness was then applied at 40° C. for 1,000 hours, the sample was allowed to stand at room temperature for 24 hours in an unloaded state. Thereafter, the sample was measured for capacitance. A change $\Delta C_1$ from the initial capacitance $C_O$ was determined, from which a percent change $\Delta C_1/C_O$ was calculated. The capacitance after standing was measured under the above-mentioned conditions.

The advantages of the invention are evident from the data of Table 1.

The inventive samples also had a temperature response of capacitance satisfying the B property that is a capacitance change within ±10% over the temperature range between −25° C. and 85° C. (reference temperature 20° C.).

Example 2 (first embodiment)

Samples were prepared as sample No. 103 of Example 1 except that the composition of dielectric layers was as shown in Table 2. Regarding the mean grain size and diffraction line, these samples were the same as sample No. 103. For these samples, measurement was done as in Example 1. The results are shown in Table 2. Note that the measurements of sample No. 103 of Example 1 are reported together.

TABLE 3

(second embodiment)

| Sample No. | Dielectric layer composition | | | | | | | | | Temperature response X7R | Change of capacitance with time (%) | Accelerated life of IR (hr.) | $\epsilon_s$ (25° C.) | Breakdown voltage $V_B$ (V/μm) |
|---|---|---|---|---|---|---|---|---|---|---|---|---|---|---|
| | MgO (mol) | $Y_2O_3$ (mol) | BaO (mol) | CaO (mol) | BaO + CaO (mol) | $SiO_2$ (mol) | MnO (mol) | $V_2O_5$ (mol) | $MoO_3$ (mol) | | | | | |
| 301 (comparison) | 2 | 2.13 | 1.74 | 1.26 | 3 | 3 | 0.19 | 0* | 0* | ○ | −6.2 | 54 | 2320 | 30 |
| 302 | 2 | 2.13 | 1.74 | 1.26 | 3 | 3 | 0.19 | 0.01 | 0 | ○ | −6.0 | 56 | 2323 | 60 |
| 303 | 2 | 2.13 | 1.74 | 1.26 | 3 | 3 | 0.19 | 0.05 | 0 | ○ | −5.8 | 79 | 2364 | 110 |
| 304 | 2 | 2.13 | 1.74 | 1.26 | 3 | 3 | 0.19 | 0.1 | 0 | ○ | −3.9 | 158 | 2366 | 125 |
| 305 | 2 | 2.13 | 1.74 | 1.26 | 3 | 3 | 0.19 | 0.2 | 0 | ○ | −2.8 | 162 | 2360 | 127 |
| 306 (comparison) | 2 | 2.13 | 1.74 | 1,26 | 3 | 3 | 0.19 | 0.4* | 0 | ○ | −3.6 | 52 | 2356 | 124 |
| 307 (comparison) | 2 | 2.13 | 1.74 | 1.26 | 3 | 3 | 0.375 | 0* | 0* | ○ | −8.0 | 60 | 2218 | 74 |
| 308 | 2 | 2.13 | 1.74 | 1.26 | 3 | 3 | 0.375 | 0.01 | 0 | ○ | −7.9 | 71 | 2220 | 86 |
| 309 | 2 | 2.13 | 1.74 | 1.26 | 3 | 3 | 0.375 | 0.05 | 0 | ○ | −7.6 | 97 | 2270 | 94 |
| 310 | 2 | 2.13 | 1.74 | 1.26 | 3 | 3 | 0.375 | 0.1 | 0 | ○ | −5.7 | 174 | 2273 | 123 |
| 311 | 2 | 2.13 | 1.74 | 1.26 | 3 | 3 | 0.375 | 0.2 | 0 | ○ | −3.4 | 178 | 2268 | 126 |
| 312 (comparison) | 2 | 2.13 | 1.74 | 1.26 | 3 | 3 | 0.375 | 0.4* | 0 | ○ | −3.0 | 54 | 2272 | 102 |
| 313 | 2 | 2.13 | 1.74 | 1.26 | 3 | 3 | 0.375 | 0 | 0.01 | ○ | −6.8 | 61 | 2238 | 72 |
| 314 | 2 | 2.13 | 1.74 | 1.26 | 3 | 3 | 0.375 | 0 | 0.05 | ○ | −6.2 | 137 | 2302 | 87 |
| 315 | 2 | 2.13 | 1.74 | 1.26 | 3 | 3 | 0.375 | 0 | 0.1 | ○ | −2.0 | 232 | 2328 | 73 |
| 316 | 2 | 2.13 | 1.74 | 1.26 | 3 | 3 | 0.375 | 0 | 0.2 | ○ | +0.4 | 586 | 2338 | 108 |
| 317 (comparison) | 2 | 2.13 | 1.74 | 1.26 | 3 | 3 | 0.375 | 0 | 0.4* | ○ | +0.5 | 27 | 2382 | 113 |
| 318 (comparison) | 2 | 2.13 | 1.74 | 1.26 | 3 | 3 | 0.375 | 0 | 0.8* | × | −3.5 | — | 2209 | 40 |
| 319 (comparison) | 2 | 2.13 | 1.74 | 1.26 | 3 | 3 | 0.375 | 0 | 1.0* | × | −3.1 | — | 2135 | — |

*values outside the limited range

As seen from the data of Table 2, better properties are obtained by adding more than 1 mol of $Y_2O_3$. Note that with more than 5 mol of $Y_2O_3$, no dense sintered bodies were obtained.

It is noted that the dielectric layers of the composition shown in Examples of U.S. Ser. No. 08/090,257 were also improved in properties as in the present Examples by selecting a mean grain size and a half-value width of X-ray diffraction to fall within the scope of the invention.

Example 3 (second embodiment)

A raw dielectric material was prepared by wet milling $BaTiO_3$ prepared by a hydrothermal synthesis method with $(MgCO_3)_4 \cdot Mg(OH)_2 \cdot 5H_2O$, $MnCO_3$, $BaCO_3$, $CaCO_3$, $SiO_2$, $Y_2O_3$, $V_2O_5$, and $MoO_3$ in a ball mill for 16 hours.

A dielectric layer-forming paste was prepared by milling 100 parts of each raw dielectric material, 4.8 parts of an acrylic resin, 40 parts of methylene chloride, 20 parts of trichloroethane, 6 parts of mineral spirit, and 4 parts of acetone in a ball mill.

Multilayer ceramic chip capacitor samples were fabricated as in Example 1 except that the thus prepared dielectric layer-forming paste was used.

The compositions of dielectric layers of the respective samples are shown in Tables 3 and 4. The composition is expressed as a proportion relative to 100 mol of $BaTiO_3$ as before.

The dielectric layers of each sample had a mean grain size of 0.35 μm. The mean grain size was calculated by the previously described procedure using a scanning electron photomicrograph of a sample section. FIG. 6 is a scanning electron photomicrograph of a dielectric layer of sample No. 310.

Figure 7:
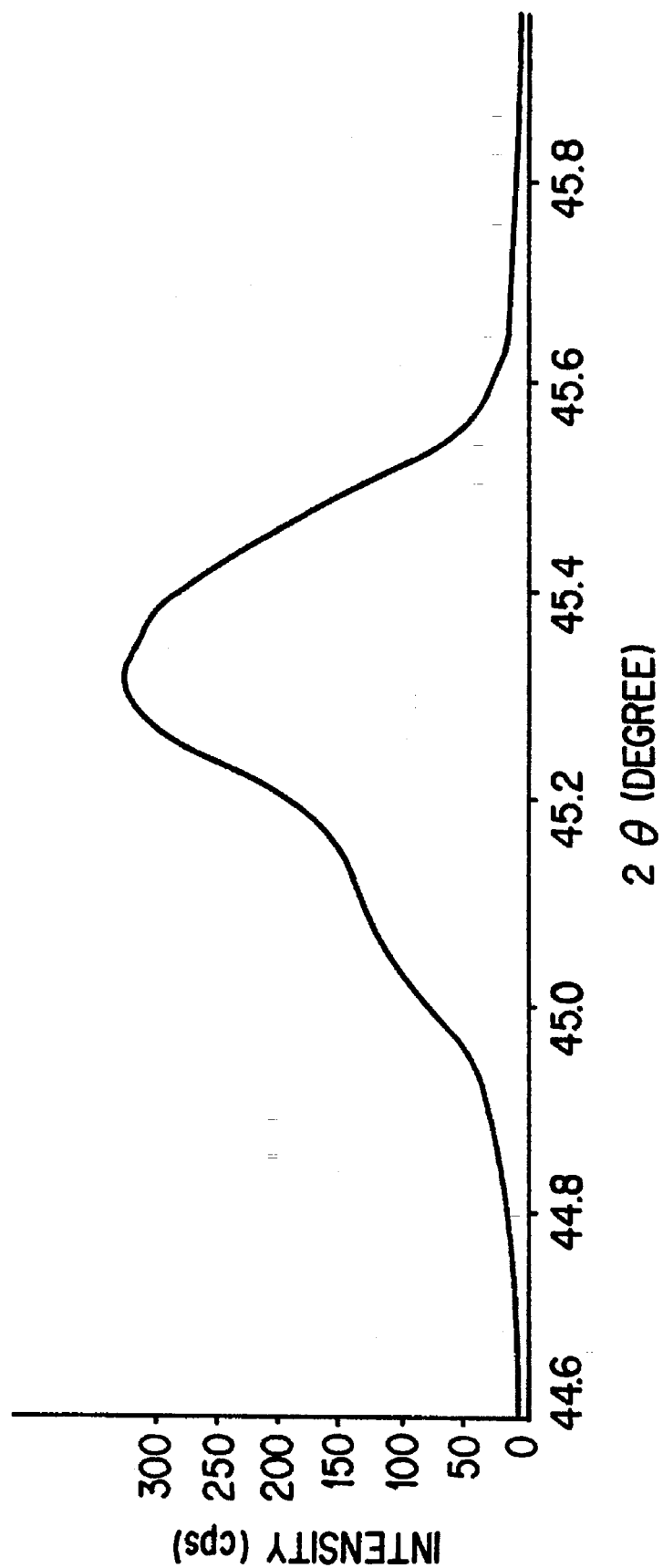
FIG. 7 is a X-ray diffraction chart of a dielectric layer in a multilayer ceramic chip capacitor.

The dielectric layer was subject to X-ray diffraction by illuminating $CuK\Delta_1$ ray to the surface of each sample. As a result, for all the samples, a diffraction line of (200) plane and a diffraction line of (002) plane overlapped one another to form a wide diffraction line, with the two diffraction lines being indistinguishable. These wide diffraction lines had a half-value width in the range 2θ=0.30° to 0.34°. An X-ray diffraction chart of sample No. 316 is shown in FIG. 7.

Figure 8:
FIG. 8 is a figure-substituting photograph or transmission electron photomicrograph of a dielectric layer in a multilayer ceramic chip capacitor.

Photomicrographs of the dielectric layers of the respective samples were taken through a transmission electron microscope, and the proportion of crystal grains in which domain walls were observable was determined therefrom. The proportion of crystal grains in which domain walls were observable was in the range of 44 to 50%. A transmission electron photomicrograph of sample No. 302 is shown in FIG. 8.

The samples were examined by the following tests. The results are shown in Tables.

Temperature Response of Capacitance

Measurement was done as in Example 1.

Change of Capacitance with Time in a DC Electric Field

Measurement was done as in Example 1.

Accelerated Life of Insulation Resistance IR

Measurement was done as in Example 1.

Specific Inductive Capacity $\epsilon_s$

Measurement was done as in Example 1.

Breakdown Voltage $V_B$

A breakdown test was carried out at room temperature by applying a DC voltage by means of an automatic voltage step-up instrument. The voltage at which the leakage current exceeds 1 mA is the breakdown voltage.

The advantages of the invention are evident from the data of Tables. Those samples whose IR accelerated life and breakdown voltage are not reported were unmeasurable due to semiconductor formation or the like.

TABLE 3

(second embodiment)

| Sample No. | Dielectric layer composition | | | | | | | | | Temperature response X7R | Change of capacitance with time (%) | Accelerated life of IR (hr.) | $\epsilon_s$ (25° C.) | Breakdown voltage $V_B$ (V/μm) |
|---|---|---|---|---|---|---|---|---|---|---|---|---|---|---|
| | MgO (mol) | $Y_2O_3$ (mol) | BaO (mol) | CaO (mol) | BaO + CaO (mol) | $SiO_2$ (mol) | MnO (mol) | $V_2O_5$ (mol) | $MoO_3$ (mol) | | | | | |
| 301 (comparison) | 2 | 2.13 | 1.74 | 1.26 | 3 | 3 | 0.19 | 0* | 0* | ○ | −6.2 | 54 | 2320 | 30 |
| 302 | 2 | 2.13 | 1.74 | 1.26 | 3 | 3 | 0.19 | 0.01 | 0 | ○ | −6.0 | 56 | 2323 | 60 |
| 303 | 2 | 2.13 | 1.74 | 1.26 | 3 | 3 | 0.19 | 0.05 | 0 | ○ | −5.8 | 79 | 2364 | 110 |
| 304 | 2 | 2.13 | 1.74 | 1.26 | 3 | 3 | 0.19 | 0.1 | 0 | ○ | −3.9 | 158 | 2366 | 125 |
| 305 | 2 | 2.13 | 1.74 | 1.26 | 3 | 3 | 0.19 | 0.2 | 0 | ○ | −2.8 | 162 | 2360 | 127 |
| 306 (comparison) | 2 | 2.13 | 1.74 | 1.26 | 3 | 3 | 0.19 | 0.4* | 0 | ○ | −3.6 | 52 | 2356 | 124 |
| 307 (comparison) | 2 | 2.13 | 1.74 | 1.26 | 3 | 3 | 0.375 | 0* | 0* | ○ | −8.0 | 60 | 2218 | 74 |
| 308 | 2 | 2.13 | 1.74 | 1.26 | 3 | 3 | 0.375 | 0.01 | 0 | ○ | −7.9 | 71 | 2220 | 86 |
| 309 | 2 | 2.13 | 1.74 | 1.26 | 3 | 3 | 0.375 | 0.05 | 0 | ○ | −7.6 | 97 | 2270 | 94 |
| 310 | 2 | 2.13 | 1.74 | 1.26 | 3 | 3 | 0.375 | 0.1 | 0 | ○ | −5.7 | 174 | 2273 | 123 |
| 311 | 2 | 2.13 | 1.74 | 1.26 | 3 | 3 | 0.375 | 0.2 | 0 | ○ | −3.4 | 178 | 2268 | 126 |
| 312 (comparison) | 2 | 2.13 | 1.74 | 1.26 | 3 | 3 | 0.375 | 0.4* | 0 | ○ | −3.0 | 54 | 2272 | 102 |
| 313 | 2 | 2.13 | 1.74 | 1.26 | 3 | 3 | 0.375 | 0 | 0.01 | ○ | −6.8 | 61 | 2238 | 72 |
| 314 | 2 | 2.13 | 1.74 | 1.26 | 3 | 3 | 0.375 | 0 | 0.05 | ○ | −6.2 | 137 | 2302 | 87 |
| 315 | 2 | 2.13 | 1.74 | 1.26 | 3 | 3 | 0.375 | 0 | 0.1 | ○ | −2.0 | 232 | 2328 | 73 |
| 316 | 2 | 2.13 | 1.74 | 1.26 | 3 | 3 | 0.375 | 0 | 0.2 | ○ | +0.4 | 586 | 2338 | 108 |
| 317 (comparison) | 2 | 2.13 | 1.74 | 1.26 | 3 | 3 | 0.375 | 0 | 0.4* | ○ | +0.5 | 27 | 2382 | 113 |
| 318 (comparison) | 2 | 2.13 | 1.74 | 1.26 | 3 | 3 | 0.375 | 0 | 0.8* | × | −3.5 | — | 2209 | 40 |
| 319 (comparison) | 2 | 2.13 | 1.74 | 1.26 | 3 | 3 | 0.375 | 0 | 1.0* | × | −3.1 | — | 2135 | — |

*values outside the limited range

TABLE 4

(second embodiment)

| Sample No. | Dielectric layer composition | | | | | | | | | Temperature response X7R | Change of capacitance with time (%) | Accelerated life of IR (hr.) | $\epsilon_s$ (25° C.) | Breakdown voltage $V_B$ (V/μm) |
|---|---|---|---|---|---|---|---|---|---|---|---|---|---|---|
| | MgO (mol) | $Y_2O_3$ (mol) | BaO (mol) | CaO (mol) | BaO + CaO (mol) | $SiO_2$ (mol) | MnO (mol) | $V_2O_5$ (mol) | $MoO_3$ (mol) | | | | | |
| 401 | 2 | 2.13 | 1.74 | 1.26 | 3 | 3 | 0.1 | 0 | 0 | ○ | −3.2 | 21 | 2380 | 94 |
| 402 | 2 | 2.13 | 1.74 | 1.26 | 3 | 3 | 0.15 | 0.1 | 0 | ○ | −3.8 | 81 | 2372 | 112 |
| 403 | 2 | 2.13 | 1.74 | 1.26 | 3 | 3 | 0.25 | 0.1 | 0 | ○ | −4.3 | 161 | 2330 | 124 |
| 404 | 2 | 2.13 | 1.74 | 1.26 | 3 | 3 | 0.3 | 0.1 | 0 | ○ | −5.1 | 168 | 2291 | 120 |
| 405 | 2 | 2.13 | 1.74 | 1.26 | 3 | 3 | 0.375 | 0.05 | 0.1 | ○ | −1.6 | 543 | 2456 | 106 |
| 406 | 2 | 2.13 | 1.74 | 1.26 | 3 | 3 | 0.375 | 0.1 | 0 | ○ | −7.3 | 39 | 2492 | 91 |
| 407 | 2 | 2.13 | 1.74 | 1.26 | 3 | 3 | 0.375 | 0.1 | 0 | ○ | −6.0 | 103 | 2325 | 94 |
| 408 | 2 | 2.13 | 1.74 | 1.26 | 3 | 3 | 0.375 | 0.1 | 0 | ○ | −5.9 | 112 | 2289 | 98 |
| 409 | 2 | 2.13 | 1.74 | 1.26 | 3 | 3 | 0.375 | 0.1 | 0 | ○ | −4.3 | 82 | 2072 | 96 |
| 410 (comparison) | 0* | 2.13 | 1.74 | 1.26 | 3 | 3 | 0.375 | 0.1 | 0 | ○ | −16.5 | 29 | 3320 | 83 |
| 411 | 0.2 | 2.13 | 1.74 | 1.26 | 3 | 3 | 0.375 | 0.01 | 0 | ○ | −14.2 | 37 | 3160 | 76 |
| 412 | 0.5 | 2.13 | 1.74 | 1.26 | 3 | 3 | 0.375 | 0.01 | 0 | ○ | −11.5 | 54 | 2802 | 80 |
| 413 | 1.5 | 2.13 | 1.74 | 1.26 | 3 | 3 | 0.375 | 0.01 | 0 | ○ | −8.7 | 68 | 2410 | 82 |
| 414 | 2 | 2.13 | 3.36 | 2.44 | 5.8 | 5.8 | 0.19 | 0.01 | 0 | ○ | −5.4 | 54 | 1851 | 42 |
| 415 | 2 | 2.13 | 4.64 | 3.36 | 8.0 | 8.0 | 0.19 | 0.01 | 0 | ○ | −6.8 | 30 | 1703 | 30 |

*values outside the limited range

Example 4 (second embodiment)

Samples were prepared as in Example 3 except that the dielectric layers had a composition as shown in Table 5 and a mean grain size of 0.60 μm. For these samples, measurement was done as in Example 3. The results are shown in Table 5.

TABLE 5

(second embodiment)

| Sample | Dielectric layer composition | | | | | | | | | Temperature response X7R | Change of capacitance with time (%) | Accelerated life of IR (hr.) | $\epsilon_s$ (25° C.) | Breakdown voltage $V_B$ (V/μm) |
| --- | --- | --- | --- | --- | --- | --- | --- | --- | --- | --- | --- | --- | --- | --- |
| | MgO (mol) | $Y_2O_3$ (mol) | BaO (mol) | CaO (mol) | BaO + CaO (mol) | $SiO_2$ (mol) | MnO (mol) | $V_2O_5$ (mol) | $MoO_3$ (mol) | | | | | |
| 501 (comparison) | 2 | 2.13 | 1.74 | 1.26 | 3 | 3 | 0.19 | 0* | 0* | ◯ | −9.1 | 0.9 | 2580 | 37 |
| 502 | 2 | 2.13 | 1.74 | 1.26 | 3 | 3 | 0.19 | 0.1 | 0 | ◯ | −6.6 | 2.0 | 2583 | 77 |
| 503 | 2 | 2.13 | 1.74 | 1.26 | 3 | 3 | 0.19 | 0 | 0.1 | ◯ | −4.8 | 3.1 | 2636 | 41 |
| 504 | 2 | 2.13 | 1.74 | 1.26 | 3 | 3 | 0.19 | 0.05 | 0.1 | ◯ | −3.9 | 16.0 | 2691 | 52 |

*values outside the limited range

The inventive samples in Tables 3 to 5 also had a temperature response of capacitance satisfying the B property that is a capacitance change within ±10% over the temperature range between −25° C. and 85° C. (reference temperature 20° C.).

ADVANTAGES

There are described multilayer ceramic chip capacitors which satisfy the X7R property relating to a temperature response of capacitance and show a very small change of capacitance with time under a DC electric field, a long accelerated life of insulation resistance IR, and improved DC bias performance. Accordingly, the multilayer ceramic chip capacitors are fully reliable even when the dielectric layers are made thin so that they may receive a higher electric field strength.

In the first embodiment, the dielectric layers have a mean grain size of up to 0.45 μm and specific properties as expressed by X-ray diffraction of the dielectric layers, whereby the change of capacitance with time under a DC electric field is further improved. Accordingly, the multilayer ceramic chip capacitors are fully reliable even when the dielectric layers are made thin so that they may receive a higher electric field strength. The accelerated life of IR is also improved by reducing the mean grain size.

In the second embodiment, the dielectric layers further contain a specific amount of vanadium oxide and/or molybdenum oxide whereby the change of capacitance with time under a DC electric field is further improved. Addition of vanadium oxide improves dielectric breakdown voltage and addition of molybdenum oxide improves the accelerated life of IR. Also in the second embodiment, where the dielectric layers have a mean grain size of up to 0.45 μm and specific properties as expressed by X-ray diffraction of the dielectric layers, the change of capacitance with time under a DC electric field is further improved and the accelerated life of IR is improved as in the first embodiment.

In this way, the multilayer ceramic chip capacitors of the invention are fully reliable even when the dielectric layers are made thin so that they may receive a higher electric field strength.

We claim:

1. A multilayer ceramic chip capacitor having a capacitor chip comprising alternately stacked dielectric layers and internal electrode layers, wherein said dielectric layers comprise a dielectric layer material which comprises barium titanate, magnesium oxide, yttrium oxide, at least one selected from barium oxide and calcium oxide, silicon oxide, manganese oxide, and at least one selected from vanadium oxide and molybdenum oxide in such a proportion that there are present MgO: 0.1 to 3 mol
$Y_2O_3$: more than 0 to 5 mol
BaO+CaO: 2 to 12 mol
$SiO_2$: 2 to 12 mol
MnO: more than 0 to 0.5 mol
$V_2O_5$: 0 to 0.3 mol
$MoO_3$: 0 to 0.3 mol
$V_2O_5$+$MoO_3$: more than 0 mol per 100 mol of $BaTiO_3$, provided that the barium titanate, magnesium oxide, yttrium oxide, barium oxide, calcium oxide, silicon oxide, manganese oxide, vanadium oxide, and molybdenum oxide are calculated as $BaTiO_3$, MgO, $Y_2O_3$, BaO, CaO, $SiO_2$, MnO, $V_2O_5$, and $MoO_3$, respectively, and wherein said dielectric layer material comprises crystal grains having a mean grain size of up to 0.45 μm, and wherein in an X-ray diffraction chart of said dielectric layer material, a diffraction line of (200) plane and a diffraction line of (002) plane overlap one another to form a wide diffraction line which has a half-value width of up to 0.35°.

2. The multilayer ceramic chip capacitor of claim 1 wherein said crystal grains have a mean grain size of at least 0.10 μm and said wide diffraction line has a half-value width of at least 0.10°.

3. The multilayer ceramic chip capacitor of claim 1 wherein a proportion of crystal grains in said dielectric material in which domain walls are observable is 35 to 85% in a section of said dielectric layers.

4. The multilayer ceramic chip capacitor of claim 1 wherein said internal electrode layers comprise a conductor selected from nickel or nickel alloy.

5. The multilayer ceramic chip capacitor of claim 4 wherein said nickel alloy comprises an alloy of nickel with at least one member of the group consisting of Mn, Cr, Co and Al.

6. The multilayer ceramic chip capacitor of claim 5 wherein said nickel alloy comprises at least 95% nickel by weight.

7. The multilayer ceramic chip capacitor of claim 1, wherein said crystal grains have a mean grain size of up to 0.35 μm.

8. The multilayer ceramic chip capacitor of claim 1 wherein said dielectric layer material comprises 0.5 to 2.0 mol of MgO; 0.01 to 0.4 mol of MnO; 0.1 to 5 mol of $Y_2O_3$; 2 to 6 mol of BaO+CaO; 2 to 6 mol of $SiO_2$; and 0 to 0.25 mol of $V_2O_5$ and 0 to 0.25 mol of $MoO_3$ wherein there is provided 0.01 to 0.3 mol of $V_2O_5$+$MoO_3$ per 100 mol of $BaTiO_3$.

9. The multilayer ceramic chip capacitor of claim 1 wherein said dielectric layer material comprises 1 to 5 mol of $Y_2O_3$ per 100 mol of $BaTiO_3$.

10. The multilayer ceramic chip capacitor of claim 1 wherein said dielectric layer material comprises 0.05 to 0.25 mol of $V_2O_5$+$MoO_3$ per 100 mol of $BaTiO_3$.

11. The multilayer ceramic chip capacitor of claim 1 wherein said dielectric layer comprises 1.1 to 3.5 mol of $Y_2O_3$ per 100 mol of $BaTiO_3$.

* * * * *

UNITED STATES PATENT AND TRADEMARK OFFICE
CERTIFICATE OF CORRECTION

PATENT NO. : 5,668,694
DATED : September 16, 1997
INVENTOR(S) : Akira SATO, et al.

It is certified that error appears in the above-indentified patent and that said Letters Patent is hereby corrected as shown below:

On the title page, item [73], the Assignee has been omitted. It should be:

--[73] Assignee: TDK CORPORATION, Tokyo, Japan--

On the title page, name of the firm is missing, it should be:

--Attorney, Agent or Firm-Oblon, Spivak, McClelland, Maier & Neustadt, P.C.--

Signed and Sealed this

Second Day of December, 1997

Attest:

BRUCE LEHMAN

*Attesting Officer*   Commissioner of Patents and Trademarks

UNITED STATES PATENT AND TRADEMARK OFFICE
CERTIFICATE OF CORRECTION

PATENT NO. : 5,668,694
DATED : September 16, 1997
INVENTOR(S) : Akira SATO, et al.

It is certified that error appears in the above-identified patent and that said Letters Patent is hereby corrected as shown below:

Column 20, line 59, "said dielectric layers." should read
--said dielectric layer material.--.

Signed and Sealed this

Nineteenth Day of May, 1998

Attest:

BRUCE LEHMAN

*Attesting Officer*  *Commissioner of Patents and Trademarks*